US010881148B2

(12) United States Patent
Nakano et al.

(10) Patent No.: US 10,881,148 B2
(45) Date of Patent: Jan. 5, 2021

(54) FLAVOR INHALER

(71) Applicant: JAPAN TOBACCO INC., Tokyo (JP)

(72) Inventors: Takuma Nakano, Tokyo (JP); Manabu Takeuchi, Tokyo (JP); Akihiko Suzuki, Tokyo (JP); Manabu Yamada, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 254 days.

(21) Appl. No.: 16/104,016

(22) Filed: Aug. 16, 2018

(65) Prior Publication Data

US 2018/0352863 A1 Dec. 13, 2018

Related U.S. Application Data

(63) Continuation of application No. PCT/JP2016/054487, filed on Feb. 16, 2016.

(51) Int. Cl.
*A24F 47/00* (2020.01)
*H02J 7/00* (2006.01)
*H05B 3/42* (2006.01)

(52) U.S. Cl.
CPC ............ *A24F 47/008* (2013.01); *A24F 47/00* (2013.01); *H02J 7/0063* (2013.01); *H05B 3/42* (2013.01)

(58) Field of Classification Search
CPC ........ A24F 47/008; A24F 47/00; A24F 40/40; A24F 40/53
See application file for complete search history.

(56) References Cited

U.S. PATENT DOCUMENTS

| | | | |
|---|---|---|---|
| 9,271,528 | B2 | 3/2016 | Liu |
| 9,289,014 | B2 | 3/2016 | Tucker et al. |
| 2011/0210116 | A1 | 9/2011 | Shigetomi et al. |
| 2012/0260927 | A1 | 10/2012 | Liu |
| 2014/0270727 | A1 | 9/2014 | Ampolini et al. |
| 2014/0334804 | A1 | 11/2014 | Choi |

(Continued)

FOREIGN PATENT DOCUMENTS

| | | | |
|---|---|---|---|
| GB | 2519101 | A | 4/2015 |
| JP | 2000-41654 | A | 2/2000 |

(Continued)

OTHER PUBLICATIONS

Japanese Office Action, dated Jun. 18, 2019, for Japanese Application No. 2017-567864, with an English translation.

(Continued)

*Primary Examiner* — Eric Yaary
*Assistant Examiner* — Jennifer A Kessie
(74) *Attorney, Agent, or Firm* — Birch, Stewart, Kolasch & Birch, LLP

(57) ABSTRACT

This flavor inhaler is provided with: a plurality of generation units for generating a component to be inhaled from a source of the component to be inhaled using power supplied from a battery; and a control unit for controlling the amount of power supplied to the plurality of generation units. The plurality of generation units are disposed on an air path that connects an inlet to an outlet. The control unit calculates $D_1$ on the basis of $V_A$ and $V_C$ and controls the amount of power on the basis of $D_1$.

16 Claims, 11 Drawing Sheets

(56) References Cited

U.S. PATENT DOCUMENTS

2015/0196059 A1* 7/2015 Liu .......................... H05B 3/06
131/329
2016/0242466 A1* 8/2016 Lord ..................... G06F 1/3296
2016/0309784 A1* 10/2016 Silvestrini ............. A24F 47/008

FOREIGN PATENT DOCUMENTS

| | | | |
|---|---|---|---|
| JP | 2001-502542 | A | 2/2001 |
| JP | 5041016 | B2 | 10/2012 |
| JP | 2014-528718 | A | 10/2014 |
| JP | 2015-509718 | A | 4/2015 |
| WO | WO 98/17131 | A1 | 4/1998 |
| WO | WO 2014/004648 | A1 | 1/2014 |
| WO | WO 2015/052513 | A2 | 4/2015 |
| WO | WO 2015/091258 | A1 | 6/2015 |
| WO | WO 2015/175701 | A1 | 11/2015 |
| WO | WO 2016/008217 | A1 | 1/2016 |

OTHER PUBLICATIONS

International Search Report for PCT/JP2016/054487 (PCT/ISA/210) dated May 17, 2016.

Korean Office Action for Korean Application No. 10-2018-7024876, dated Mar. 12, 2020, with English translation.

Canadian Office Action, dated Jun. 4, 2019, for corresponding Canadian Application No. 3,013,420.

Eurasian Office Action for Eurasian Application No. 201891849, dated Sep. 30, 2019, with an English translation.

Extended European Search Report for European Application No. 18890500.8, dated Nov. 11, 2019.

Partial Supplementary European Search Report, dated Aug. 5, 2019, for European Application No. 16890500.8.

* cited by examiner

FLAVOR INHALER

CROSS REFERENCE TO RELATED APPLICATIONS

This application is a Continuation of PCT International Application No. PCT/JP2016/054487, filed on Feb. 16, 2016, which is hereby expressly incorporated by reference into the present application.

TECHNICAL FIELD

The present invention relates to a flavor inhaler including a plurality of generators generating an inhalation component from an inhalation component source by a power supplied from a battery.

BACKGROUND ART

In recent years, known is a flavor inhaler including a plurality of generators generating an inhalation component from an inhalation component source by power supplied from a battery. Also, proposed is a flavor inhaler including a plurality of cartridges each has the generator in an attachable and detachable manner (for example, Patent Document 1).

PRIOR ART DOCUMENT

Non-Patent Document

Patent Document 1: US 2015/0196059 A

SUMMARY

A first feature is summarized as a flavor inhaler comprising: a battery that accumulates a power; a first generator that generates a first inhalation component from a first inhalation component source by the power supplied from the battery; a second generator that generates a second inhalation component from a second inhalation component source by the power supplied from the battery; and a controller that controls a power amount to be supplied to the first generator and the second generator, wherein the first generator and the second generator are provided on an air passage communicating from an inlet to an outlet, the first generator and the second generator are electrically connected in parallel or in series, an output voltage value of the battery is expressed by $V_A$, a reference voltage value of the battery is expressed by $V_C$, a correction term of the power amount to be supplied to the first generator and the second generator is expressed by $D_1$, and the controller calculates the $D_1$ based on the $V_A$ and the $V_C$ and to control the power amount based on the $D_1$.

A second feature according to the first feature is summarized as that the second generator is provided downstream of the first generator on the air passage.

A third feature according to any one of the first and second features is summarized as that the first generator and the second generator are electrically connected in series.

A fourth feature is summarized as a flavor inhaler comprising: a battery that accumulates a power; a first generator that generates a first inhalation component from a first inhalation component source by the power supplied from the battery; and a second generator that generates a second inhalation component from a second inhalation component source by the power supplied from the battery, wherein the first generator and the second generator are provided on an air passage communicating from an inlet to an outlet, the first generator and the second generator are electrically connected in parallel or in series, and at least one of the first generator and the second generator is configured by a coiled resistance heating element extending along the air passage.

A fifth feature according to any one of the first to fourth features is summarized as the flavor inhaler comprising: a first unit including at least the first generator; and a second unit including at least the second generator, wherein the first unit and the second unit are separate bodies.

A sixth feature according to the fifth feature is summarized as that the second unit is configured to be attachable to and detachable from the first unit.

A seventh feature according to any one of the fifth and sixth features is summarized as that the first generator and the second generator are electrically connected via a connection point or a conductive member when connecting the first unit and the second unit, and the first generator and the second generator are electrically connected on an electrical circuit via the connection point or the conductive member, without passing through the controller.

An eighth feature according to any one of the first to seventh features is summarized as that at least one of the first inhalation component source and the second inhalation component source is an aerosol source, and at least one of the first generator and the second generator is an atomizer atomizing the aerosol source.

A ninth feature according to the eighth feature is summarized as that the atomizer is configured by a resistance heating element.

A tenth feature according to the fourth feature is summarized as the flavor inhaler comprising: a controller that controls a power amount to be supplied to the first generator and the second generator, wherein an output voltage value of the battery is expressed by $V_A$, a reference voltage value of the battery is expressed by $V_C$, a correction term of the power amount to be supplied to the first generator and the second generator is expressed by $D_1$, and the controller calculates the $D_1$ based on the $V_A$ and the $V_C$ and to control the power amount based on the $D_1$.

An eleventh feature according to any one of the first to third and tenth features is summarized as that the controller calculates the $D_1$ according to an equation of $D_1=V_C^2/V_A^2$.

A twelfth feature according to any one of the first to third, tenth and eleventh features is summarized as that the controller acquires the $V_A$ in a state where a voltage is applied to at least any one of the first generator and the second generator.

A thirteenth feature according to any one of the first to third and tenth to twelfth features is summarized as that the first generator and the second generator are configured by a resistance heating element, and the controller acquires an electrical resistance value of the first generator and a combined resistance value of the first generator and the second generator.

A fourteenth feature according to any one of the first to thirteenth features is summarized as that the first generator and the second generator are electrically connected in series, the first generator and the second generator are configured by a resistance heating element, an electrical resistance value of the first generator is expressed by $R_1$, an electrical resistance value of the second generator is expressed by $R_2$, a correction term of the power amount to be supplied to the first generator is expressed by $D_2$, and a controller that calculates the $D_2$ based on the $R_1$ and the $R_2$ and to controls the power amount to be supplied to the first generator based on the $D_2$.

A fifteenth feature according to the fourteenth feature is summarized as that the controller calculates the $D_2$ according to an equation of $D_2=(R_1+R_2)^2/R_1^2$.

A sixteenth feature according to any one of the first to fifteenth features is summarized as that the first generator is configured by a resistance heating element, and an information source is provided, the information source including the electrical resistance value of the first generator or identification information associated with the electrical resistance value of the first generator.

A seventeenth feature according to any one of the first to sixteenth features is summarized as that the controller controls the power amount to be supplied to the first generator so that the power amount to be supplied to the first generator during one puff action does not exceed an upper limit threshold value.

DESCRIPTION OF EMBODIMENTS

Figure 1:
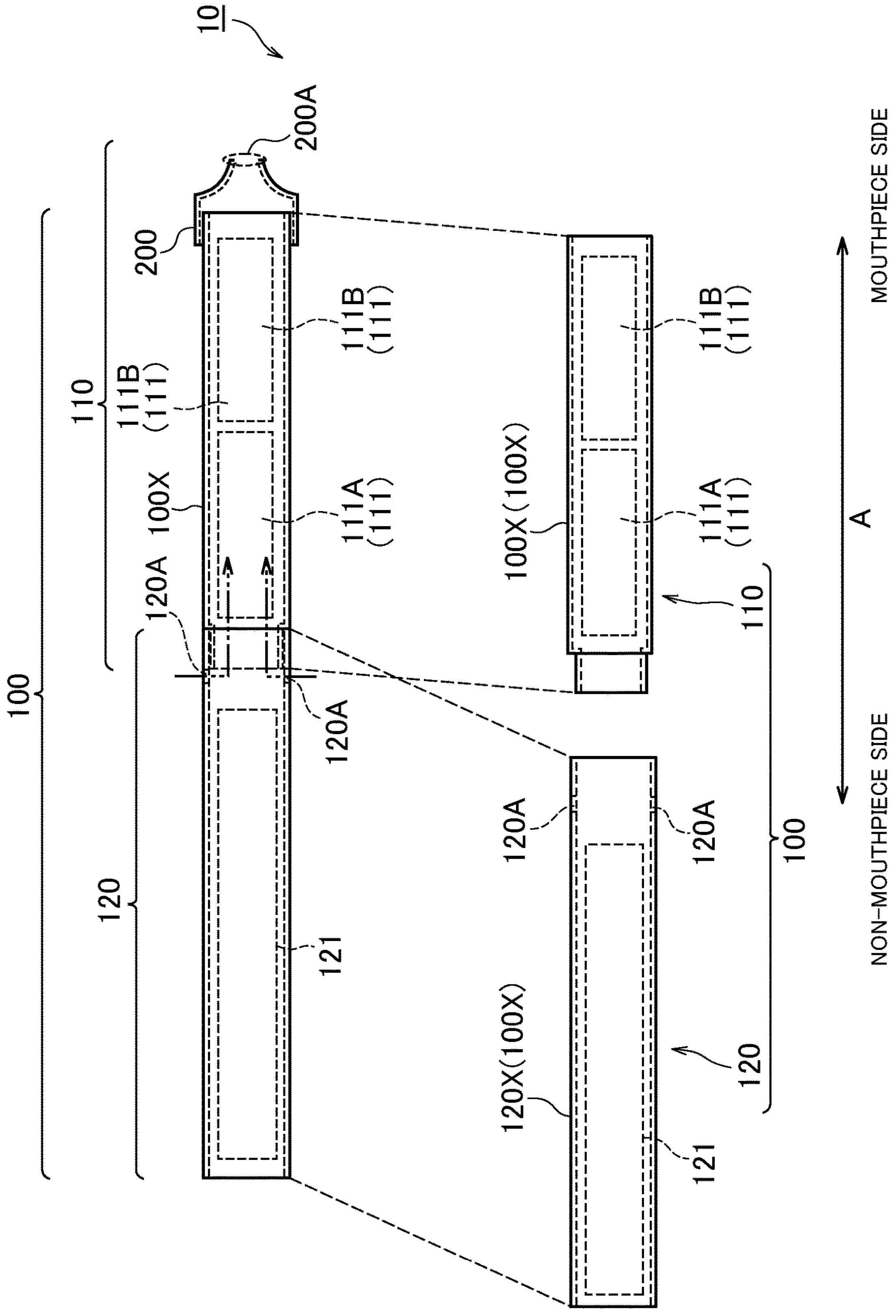
FIG. 1 is a diagram illustrating a flavor inhaler 10 according to an embodiment.

Hereinafter, embodiments of the present invention will be described. In the following description of the drawings, the same or similar parts are denoted by the same or similar reference numerals. It is noted that the drawings are schematic, and the ratios of dimensions and the like may be different from the actual ones.

Therefore, specific dimensions and the like should be determined by referring to the following description. Of course, the drawings may include the parts with different dimensions and ratios.

OVERVIEW OF DISCLOSURE

In the Background Art mentioned above, as a result of extensive studies, the inventors and others discovered that it is necessary, in a case where a plurality of generators are provided, to contrive an arrangement relationship and an electrical connection relationship of the plurality of generators, and that it is necessary to accurately manage a power amount to be supplied from a battery to the plurality of generators.

Firstly, a flavor inhaler comprises: a battery that accumulates a power; a first generator that generates a first inhalation component from a first inhalation component source by the power supplied from the battery; a second generator that generates a second inhalation component from a second inhalation component source by the power supplied from the battery; and a controller that controls a power amount to be supplied to the first generator and the second generator. The first generator and the second generator are provided on an air passage communicating from an inlet to an outlet. The first generator and the second generator are electrically connected in parallel or in series. An output voltage value of the battery is expressed by $V_A$, a reference voltage value of the battery is expressed by $V_C$, a correction term of the power amount to be supplied to the first generator and the second generator is expressed by $D_1$. The controller calculates the $D_1$ based on the $V_A$ and the $V_C$ and to control the power amount based on the $D_1$.

In the embodiment, the controller is that calculates $D_1$ based on $V_A$ and $V_C$ and to control the power amount based on $D_1$. Therefore, even if the output voltage value of the battery may vary with a number of connections of the generator and a configuration of each generator (especially, an electrical resistance value), a desired amount of power can be supplied to the first generator and the second generator.

Secondly, a flavor inhaler comprises: a battery that accumulates a power; a first generator that generates a first inhalation component from a first inhalation component source by the power supplied from the battery; a second generator that generates a second inhalation component from a second inhalation component source by the power supplied from the battery; and a controller that controls a power amount to be supplied to the first generator and the second generator. The first generator and the second generator are provided on an air passage communicating from an inlet to an outlet. The first generator and the second generator are electrically connected in parallel or in series. At least one of the first generator and the second generator is configured by a coiled resistance heating element extending along the air passage.

In the embodiment, at least one of the first generator and the second generator is configured by the coiled resistance heating element extending along the air passage. Therefore, an arrangement of a conductive member for supplying power to the generator including the resistance heating element is easy.

Embodiment (Flavor Inhaler)

Figure 2:
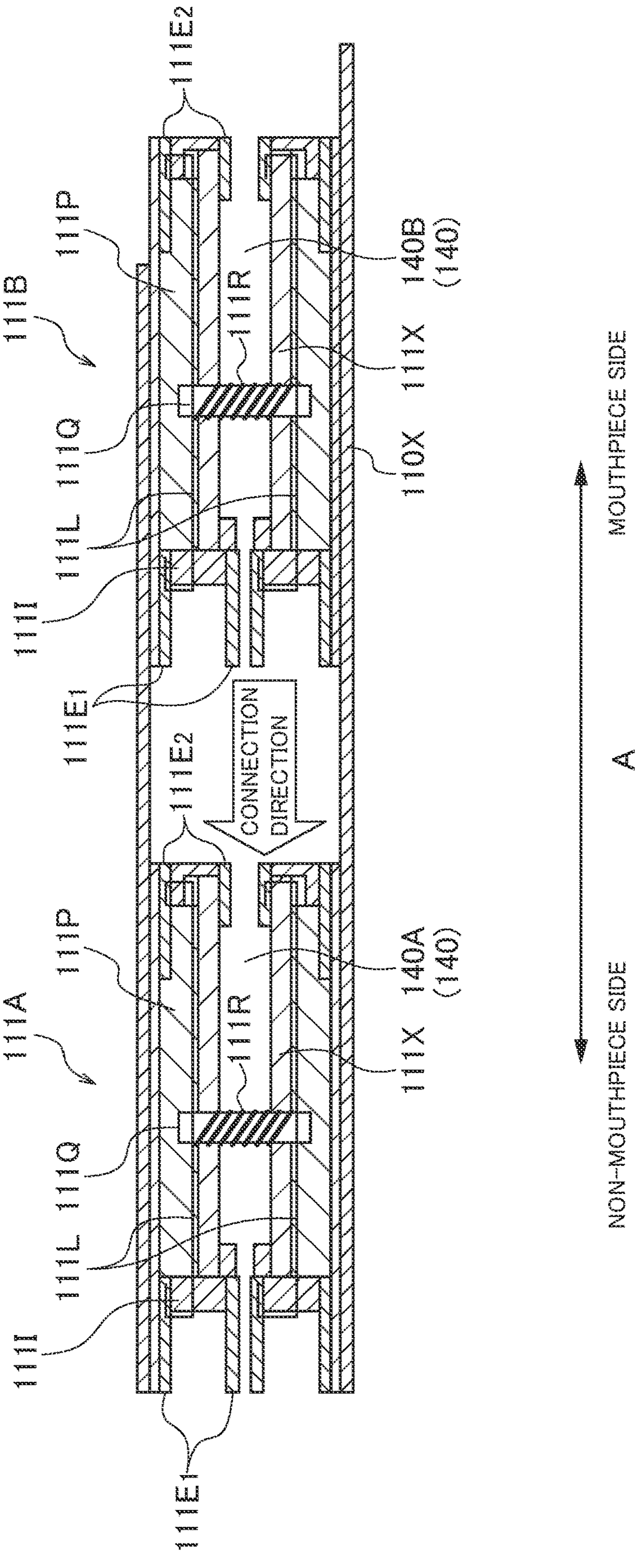
FIG. 2 is a diagram illustrating an atomizing unit 111 according to the embodiment.

A flavor inhaler according to the embodiment will be described, below. FIG. 1 is a diagram illustrating a flavor inhaler 10 according to the embodiment. FIG. 2 is a diagram illustrating an atomizing unit 111 according to the embodiment. The flavor inhaler 10 is a device used to inhale an inhaling flavor component without burning, and has a shape extending along a predetermined direction A that is a direction from a non-mouthpiece end toward a mouthpiece end.

As illustrated in FIG. 1, the flavor inhaler 10 includes an inhaler main body 100 and a mouthpiece unit 200.

The inhaler main body 100 configures a main body of the flavor inhaler 10, and has a shape connectable to the mouthpiece unit 200. The inhaler main body 100 includes a first main body unit 110 and a second main body unit 120. Specifically, the inhaler main body 100 includes a cylinder 100X, and the mouthpiece unit 200 is connected to a mouthpiece-side end of the cylinder 100X.

The first main body unit 110 includes a first cylinder 110X configuring a part of the cylinder 100X. The first main body unit 110 includes a plurality of generators generating, by power supplied from a later-described battery 121, an inhalation component from an inhalation component source. In the embodiment, the first main body unit 110 includes, as the plurality of atomizing units 111 including each of the plurality of generators, a first atomizing unit 111A and a second atomizing unit 111B.

Here, the first atomizing unit 111A and the second atomizing unit 111B may have a similar configuration or may have a different configuration. In the embodiment, description proceeds under the assumption that the first atomizing unit 111A and the second atomizing unit 111B have the similar configuration. It is preferable that the first atomizing unit 111A and the second atomizing unit 111B are separate units. The first atomizing unit 111A and the second atomizing unit 111B may be configured to be attachable to and detachable from the cylinder 100X. The first atomizing unit 111A and the second atomizing unit 111B may be configured to be attachable to and detachable from each other.

As illustrated in FIG. 2, in the embodiment, each of the plurality of atomizing units 111 includes a reservoir 111P, a wick 111Q, and a generator 111R. The reservoir 111P stores the inhalation component source. For example, the reservoir 111P is a porous body configured by a material such as a resin web. The wick 111Q retains the inhalation component source stored in the reservoir 111P. For example, the wick 111Q is made of glass fibers. The generator 111R generates the inhalation component from the inhalation component source retained by the wick 111Q.

In the embodiment, the generator 111R is configured, for example, by a resistance heating element wound around the wick 111Q at a predetermined pitch. The resistance heating element has a shape of a coil extending so as to cross the air passage communicating from an inlet 120A to a later-described outlet 200A.

The inhalation component source is a material for generating the inhalation component. In the embodiment, the inhalation component source is an aerosol source for generating an aerosol as the inhalation component. Therefore, the generator 111R is an example of an atomizer atomizes the inhalation component source (the aerosol source).

The inhalation component source is, for example, a liquid (the aerosol source) such as glycerin or propylene glycol. The inhalation component source is, for example, as described above, retained by the porous body made of the material such as the resin web. The porous body may be made of a non-tobacco material, or may be made of a tobacco material. It is noted that the inhalation component source may include a flavor source containing a flavor component. Alternatively, the inhalation component source may not include the flavor source containing the flavor component.

Here, each of the plurality of atomizing units 111 includes, as illustrated in FIG. 2, in addition to the reservoir 111P, the wick 111Q, and the generator 111R, a cylindrical member 111X, an electrode 111E, a lead wire 111L, and an insulating member 111I.

The cylindrical member 111X configures the air passage in one atomizing unit 111. The reservoir 111P mentioned above is arranged parallel to the air passage and is separated from the air passage by the cylindrical member 111X. The wick 111Q mentioned above pierces the cylindrical member 111X and crosses the air passage. The generator 111R mentioned above is arranged in the air passage of the cylindrical member 111X. The electrode 111E provided in one atomizing unit 111 includes an electrode pair 111$E_1$ provided upstream with respect to the generator 111R in the air passage and an electrode pair 111$E_2$ provided downstream with respect to the generator 111R in the air passage. The electrode pair 111$E_1$ and the electrode pair 111$E_2$ provided in one atomizing unit 111 each configure one pair of electrodes (a positive electrode and a negative electrode). The lead wire 111L is a power wire that electrically connects the electrode pair 111$E_1$ and the electrode pair 111$E_2$ in one atomizing unit 111. Further, the negative electrode and the positive electrode configuring the electrode pair 111$E_1$ are electrically connected via the lead wire 111L and the generator 111R. The same applies to each electrode configuring the electrode pair 111$E_2$. The insulating member 111I provides insulation so that the electrodes (the positive electrode and the negative electrode) do not directly contact in one atomizing unit 111.

With such a configuration, if the first atomizing unit 111A and the second atomizing unit 111B are arranged in a serial positional relationship in the cylinder 100X, the electrode pair 111$E_1$ of the second atomizing unit 111B is electrically connected to the electrode pair 111$E_2$ of the first atomizing unit 111A without through a control circuit 50 (a controller 51).

The second main body unit 120 includes a second cylinder 120X configuring a part of the cylinder 100X. The second main body unit 120 is an electrical unit including the battery 121 that drives the flavor inhaler 10 and a control circuit (the later-described control circuit 50) that controls the flavor inhaler 10. The battery 121 and the control circuit 50 are housed in the second cylinder 120X. The battery 121 is, for example, a lithium-ion battery. The control circuit 50 is configured, for example, by a CPU and a memory. In the embodiment, the second main body unit 120 includes the inlet 120A. As illustrated in FIG. 2, the air introduced from the inlet 120A is led to the atomizing unit 111 (the generator 111R). In other words, the plurality of atomizing units 111 (the generators 111R) are provided in the air passage communicating from the inlet 120A to the later-described outlet 200A.

The mouthpiece unit 200 is configured to be connectable to the inhaler main body 100 configuring the flavor inhaler 10. The mouthpiece unit 200 includes the outlet 200A (mouthpiece) that delivers the inhalation component into an oral cavity of a user.

(Aerosol Passage)

An aerosol passage according to the embodiment will be described, below. FIG. 2 is a diagram for describing the aerosol passage according to the embodiment. Specifically, FIG. 2 is a schematic cross-sectional diagram illustrating an inner structure of the plurality of atomizing units 111.

As illustrated in FIG. 2, the flavor inhaler 10 includes an aerosol passage 140 that leads the aerosol generated by the atomizing unit 111 to a side of the outlet 200A. In other words, in a state where the mouthpiece unit 200 is housed in the inhaler main body 100, the aerosol passage 140 is formed, which leads the aerosol generated by the atomizing unit 111 to the side of the outlet 200A. The aerosol passage 140 includes a first passage 140A that leads the aerosol generated from the first atomizing unit 111A and a second passage 140B that leads the aerosol generated from the second atomizing unit 111B. The aerosol generated from the first atomizing unit 111A and the second atomizing unit 111B is lead via the mouthpiece unit 200 to the outlet 200A.

In the embodiment, the first atomizing unit 111A and the second atomizing unit 111B are arranged in a serial positional relationship in the cylinder 100X. In other words, the second atomizing unit 111B is provided downstream of the first atomizing unit 111A on the air passage communicating from the inlet 120A to the outlet 200A.

(Block Configuration)

Figure 3:
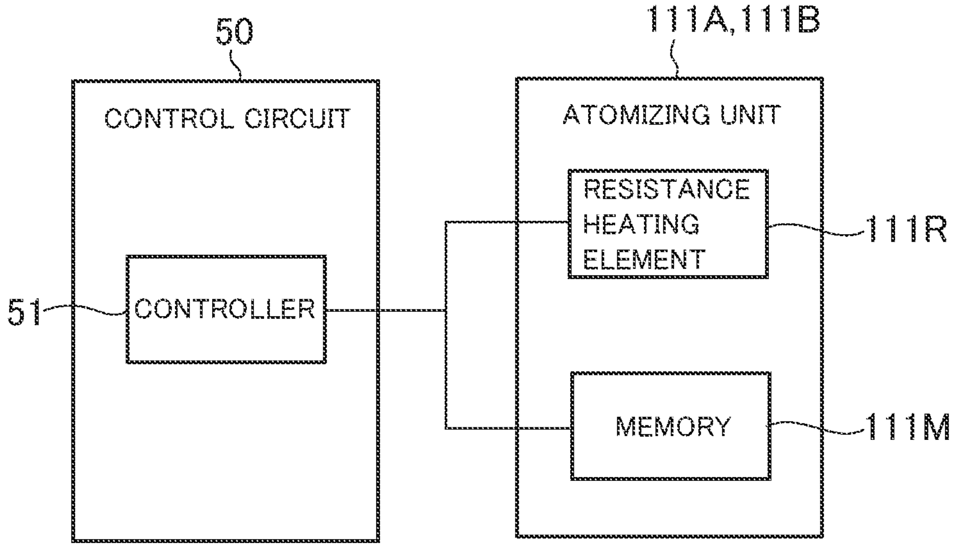
FIG. 3 is a diagram illustrating a block configuration of the flavor inhaler 10 according to the embodiment.

A block configuration of the flavor inhaler according to the embodiment will be described, below. FIG. 3 is a diagram illustrating the block configuration of the flavor inhaler 10 according to the embodiment.

As illustrated in FIG. 3, the above-described atomizing unit 111 (the first atomizing unit 111A and the second atomizing unit 111B) includes, in addition to the generator 111R and the like, a memory 111M. The control circuit 50 provided in the electrical unit mentioned above includes the controller 51.

The memory 111M is an example of an information source which includes a specific parameter of the atomizing unit 111 (the wick 111Q, the generator 111R, etc.) or identification information associated with the specific parameter. In the embodiment, the memory 111M stores the specific parameter of the atomizing unit 111.

The memory 111M may store an electrical resistance value of the generator 111R or identification information associated with the electrical resistance value of the generator 111R. In the embodiment, the memory 111M stores the electrical resistance value of the generator 111R. Here, the memory 111M provided in the first atomizing unit 111A stores an electrical resistance value of the generator 111R provided in the first atomizing unit 111A and the memory 111M provided in the second atomizing unit 111B stores an electrical resistance value of the generator 111R provided in the second atomizing unit 111B.

The memory 111M may store remaining amount information indicating a remaining amount of the inhalation component source stored in the reservoir 111P or identification information associated with the remaining amount information. In the embodiment, the memory 111M stores the remaining amount information.

Here, the electrical resistance value of the generator 111R may be an actually measured value of the electrical resistance value or an estimated value of the electrical resistance value. Specifically, if the electrical resistance value of the generator 111R is measured by connecting terminals of a measurement device to both ends of the generator 111R, it is possible to use the actually measured value as the electrical resistance value of the generator 111R. Alternatively, in a state where the electrode for connection with the power source provided in the flavor inhaler 10 is connected to the generator 111R, it is necessary to consider an electrical resistance value of a part (such as an electrode) other than the generator 111R if the electrical resistance value of the generator 111R is measured by connecting a terminal of a measurement device to an electrode connected to the generator 111R. In such a case, it is preferable to use an estimated value in consideration of the electrical resistance value of the part (such as the electrode) other than the generator 111R as the electrical resistance value of the generator 111R.

Further, a magnitude of the power amount to be supplied to the generator 111R is defined by the electrical resistance value of the generator 111R, a value of a voltage applied to the generator 111R and a time during which the voltage is applied to the generator 111R. Here, mainly the value of the voltage applied to the generator 111R and the time during which the voltage is applied to the generator 111R will be considered. For example, in a case where the voltage is continuously applied to the generator 111R, the magnitude of the power amount to be supplied to the generator 111R is changed depending on a change in the value of the voltage applied to the generator 111R. On the other hand, in a case (pulse control) where the voltage is intermittently applied to the generator 111R, the magnitude of the power amount to be supplied to the generator 111R is changed depending on a change in the value of the voltage applied to the generator 111R or a duty ratio (that is, a pulse width and a pulse interval).

The controller 51 controls the power amount to be supplied to the generator 111R. Here, the controller 51 calculates, according to an equation of $L=aE+b$, an amount of the inhalation component source consumed during one puff action.

E: power amount to be supplied to the generator 111R during one puff action a, b: specific parameters of the atomizing unit 111

Figure 4:
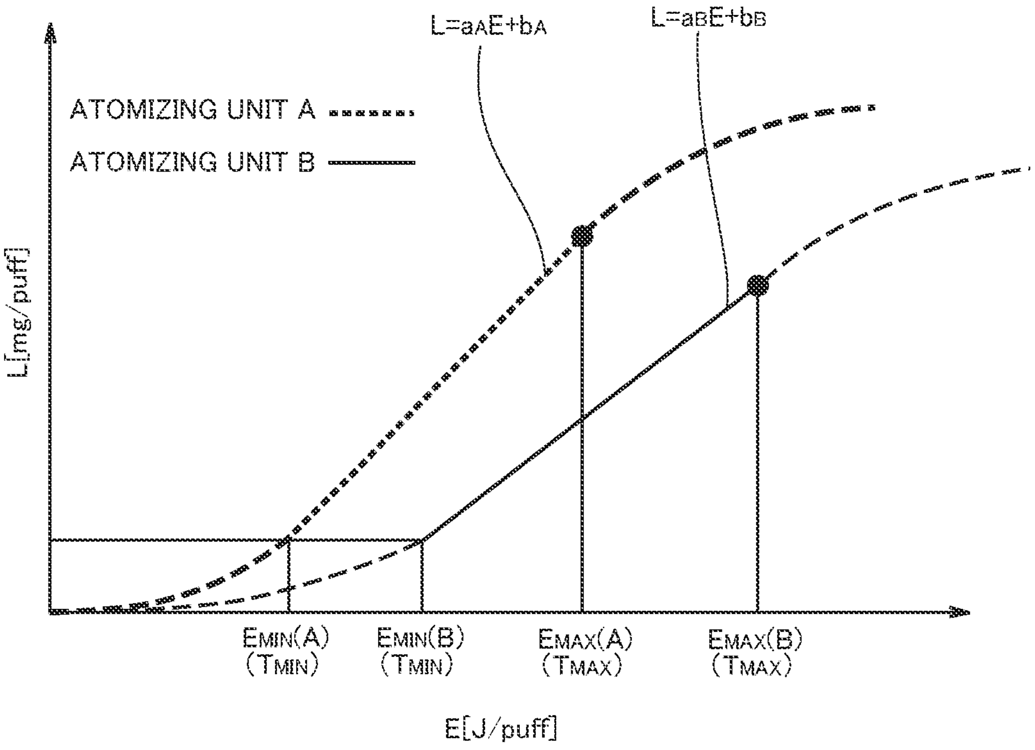
FIG. 4 is a graph for describing a linear relationship of L and E according to the embodiment.

L: the amount of the inhalation component source consumed during one puff action In particular, as shown in FIG. 4, as a result of extensive studies, the inventors and others discovered that E and L have a linear relationship and such a linear relationship differs for each atomizing unit 111. In FIG. 4, a vertical axis is L [mg/puff], and a horizontal axis is E [J/puff]. For example, as for an atomizing unit A, E and L have the linear relationship if E is within a range from $E_{MIN}$ (A) to $E_{MAX}$ (A), and specific parameters of the atomizing unit A are $a_A$ and $b_A$. Meanwhile, as for an atomizing unit B, E and L have the linear relationship if E is within a range from $E_{MIN}$ (B) to $E_{MAX}$ (B), and specific parameters of the atomizing unit B are $a_B$ and $b_B$.

As above, at least the parameters a and b that define the linear relationship between E and L differ for each atomizing unit 111, and thus, are specific parameters of the atomizing unit 111. Further, parameters $E_{MIN}$ and $E_{MAX}$ that define a range in which E and L have the linear relationship also differ for each atomizing unit 111, and thus, can be considered as specific parameters of the atomizing unit 111.

Here, the specific parameters of the atomizing unit 111 depend on a composition of the wick 111Q, a composition of the generator 111R, a composition of the inhalation component source, a structure of the atomizing unit 111 (the wick 111Q and the generator 111R), and the like. Therefore, it should be noted that the specific parameters differ for each atomizing unit 111.

It is noted that the above-described memory 111M may store, in addition to the parameters a and b, the parameters $E_{MIN}$ and $E_{MAX}$ or identification information associated with these specific parameters. However, E is affected by a voltage $V_S$ applied to the generator 111R and an application time T of the voltage $V_S$, and thus, $E_{MIN}$ and $E_{MAX}$ may be specified by the voltage $V_S$, $T_{MIN}$, and $T_{MAX}$. That is, the above-described memory 111M may store, in addition to the parameters a and b, the parameters voltage $V_S$, $T_{MIN}$, and $T_{MAX}$ or identification information associated with these specific parameters. It is noted that the voltage $V_S$ is a parameter used for replacing $E_{MIN}$ and $E_{MAX}$ with $T_{MIN}$ and $T_{MAX}$, and may be a constant value. If the voltage $V_S$ is the constant value, the voltage $V_S$ may not need to be stored in the memory 111M. In the embodiment, the voltage $V_S$ corresponds to a reference voltage value $V_C$ described later, and the memory 111M stores the parameters $T_{MIN}$ and $T_{MAX}$.

The controller 51 may control the power amount to be supplied to the generator 111R so that E (T) does not exceed $E_{MAX}$ ($T_{MAX}$). Specifically, for example, if the power amount (application time) reaches $E_{MAX}$ ($T_{MAX}$), the controller 51 ends the power supply to the generator 111R. Therefore, if E reaches $E_{MAX}$, the controller 51 may calculate, according to an equation of $L=aE_{MAX}+b$, the amount of the inhalation component source consumed during one puff action. On the other hand, if E (T) is $E_{MIN}$ ($T_{MIN}$) or below, the controller 51 may calculate, according to an equation of $L=aE_{MIN}+b$, the amount of the inhalation component source consumed during one puff action. In such a case, if E is within the range from $E_{MIN}$ to $E_{MAX}$, the controller 51 may calculate, according to the equation of $L=aE+b$, the amount of the inhalation component source consumed during one puff action.

Here, as for the controller 51, if the power amount (application time) of any of the plurality of atomizing units 111 reaches $E_{MAX}$ ($T_{MAX}$), the controller 51 may end the power supply to the generator 111R.

In the embodiment, the controller 51 estimates, based on L, the remaining amount (mg) of the inhalation component source. Specifically, the controller 51 calculates L (mg) for each one puff action, subtracts L from the remaining amount of the inhalation component source indicated by the remaining amount information stored in the memory 111M, and updates the remaining amount information stored in the memory 111M.

If the remaining amount of the inhalation component source falls below a threshold value, the controller 51 may prohibit the power supply to the generator 111R or may notify the user that the remaining amount of the inhalation component source falls below the threshold value. If the remaining amount information cannot be acquired, the controller 51 may prohibit the power supply to the generator 111R or may notify the user that the remaining amount information cannot be acquired. The notification to the user may be performed by light emission of a light-emitting element provided in the flavor inhaler 10, for example.

Here, if the remaining amount of the inhalation component source of any of the plurality of atomizing units 111 falls below the threshold value, the controller 51 may prohibit the power supply to the generator 111R or may notify the user that the remaining amount of the inhalation component source falls below the threshold value. If the remaining amount information of any of the plurality of atomizing units 111 cannot be acquired, the controller 51 may prohibit power supply to the generator 111R or may notify the user that the remaining amount information cannot be acquired.

In the embodiment, if a power amount $E_n$ is supplied to an $n^{th}$ generator 111R among the plurality of generators 111R, the controller 51 may calculate $E_n$, according to an equation of $E_n=V_n^2/R_n \times T$. $E_n$ may be used for estimating the remaining amount of the inhalation component source of an $n^{th}$ atomizing unit 111.

$E_n$: power amount in a case where $V_n$ is applied to the $n^{th}$ generator 111R $V_n$: voltage value applied to the $n^{th}$ generator 111R T: time during which voltage is applied to the plurality of generators 111R $R_n$: electrical resistance value of the $n^{th}$ generator 111R It is noted that $V_n$ can be specified based on an output voltage value $V_A$ of the battery, an electrical connection relationship of the plurality of generators 111R, and the electrical resistance value of each of the generators 111R. If the plurality of generators 111R are electrically connected in parallel, $V_n$ may be considered as a value of $V_A$. If the plurality of generators 111R are electrically connected in parallel, $V_n$ may be considered as a value obtained by dividing $V_A$ with the electrical resistance value of each generator 111R.

Further, $V_A$ and T are values detectable by the controller 51, and R is a value acquirable by the controller 51 as a result of reading out from the memory 111M. It is noted that R may be estimated by the controller 51.

In the embodiment, the controller 51 calculates a correction term $D_1$ based on the output voltage value $V_A$ of the battery and a reference voltage value $V_C$ of the battery and controls the power amount to be supplied to the plurality of generators 111R based on the correction term $D_1$. For example, in response to a start of the puff action, the controller 51 sets a control parameter for controlling the power amount to be supplied to each generator 111R. Specifically, the controller 51 calculates the correction term $D_1$ for correcting the power amount to be supplied to the generator 111R and sets the calculated correction term $D_1$. According to such a configuration, it is possible to set the correction term $D_1$ in accordance with a circuit configuration at a time when the user actually uses the flavor inhaler 10. That is, even if the circuit configuration may change, it is possible to set an appropriate correction term $D_1$. In such a case, during a time from detecting the start of the puff action until a temperature of the generator 111R reaches a boiling point of the inhalation component (until the generator 111R is substantially driven), the controller 51 detects the output voltage value $V_A$ of the battery and calculates the correction term $D_1$ applied to the detected puff action, based on the detected output voltage value $V_A$ of the battery and the reference voltage value $V_C$. The controller 51 may detect the start of the puff action if a value detected by a sensor provided in the air passage exceeds a predetermined value, and the controller 51 may detect the start of the puff action if a switch for driving the generator 111R (for example, a push button) is pushed. By detecting the output voltage value $V_A$ of the battery and calculating the correction term $D_1$ at such a timing, it is possible to appropriately calculate the correction term $D_1$ applied to the detected puff action.

Detecting the output voltage value $V_A$ of the battery and calculating the correction term $D_1$ at a timing after detecting the start of the above-described puff action, is advantageous in the point of suppressing a consumed power amount and maintaining the precision of the correction term $D_1$. In particular, by acquiring the correction term $D_1$ at the timing mentioned above, it is possible to suppress a reduction in the precision of the correction term $D_1$ applied to the detected puff action, compared to a case where the detection of the output voltage value $V_A$ of the battery and the calculation of the correction term $D_1$ are performed at a constant interval, especially if the constant interval is a long duration (for example, one minute). Further, in the case where the detection of the output voltage value $V_A$ of the battery and the calculation of the correction term $D_1$ are performed at the constant interval, it is possible to suppress an increase in consumed power accompanying the detection of the output voltage value $V_A$ of the battery and the calculation of the correction term $D_1$, compared to a case where the constant interval is a short duration (for example, one second).

Further, in the calculation of the correction term $D_1$, the controller 51 may detect the output voltage value $V_A$ of the battery a plurality of times and derive a representative value of the output voltage value $V_A$ from the detected plurality of output voltage values $V_A$. The representative value of the output voltage value $V_A$ is, for example, an average value of the plurality of the output voltage values $V_A$.

$V_C$ is a value predetermined depending on a value of a voltage to be applied to each generator 111R, a type of the battery, and the like, and is a voltage higher than at least a final voltage of the battery. If the battery is a lithium-ion battery, the reference voltage value $V_C$ can be 3.2 V, for example. In a case where a level of the power amount supplied to the generator 111R can be set in a plurality of levels, that is, in a case where the flavor inhaler 10 has a plurality of modes having different amount of aerosol generated during one puff action, a plurality of reference voltage values $V_C$ may be set.

In particular, the output voltage value $V_A$ of the battery varies with a number of connections of the generator 111R and a configuration of each generator 111R (especially, the electrical resistance value). To suppress such a variation, the controller 51 calculates the correction term $D_1$ according to an equation of $D_1=V_C/V_A$. Preferably, the controller 51 calculates the correction term $D_1$ according to an equation of $D_1=V_C^2/V_A^2$. The controller 51 controls a power amount E to be supplied to the plurality of generators 111R according to an equation of $E=D_1\times E_A$. In other words, the controller 51 may control the power amount E to be supplied to the plurality of generators 111R according to an equation of $E=D_1\times V_A^2/R\times T$. It is noted that in a case where the correction using $D_1$ is not performed, $E_A$ is the power amount to be supplied to the plurality of generators 111R.

Here, a method of correcting E by using $D_1$ may include correcting the voltage applied to the generator 111R (for example, $D_1\times V_A$) or correcting the duty ratio (that is, the pulse width and the pulse interval) (for example, $D_1\times T$). It is noted that the correction of the voltage applied to the generator 111R is achieved by using a DC/DC converter, for example. The DC/DC converter may be a step-down converter or a step-up converter.

(Circuit Configuration)

Figure 5:
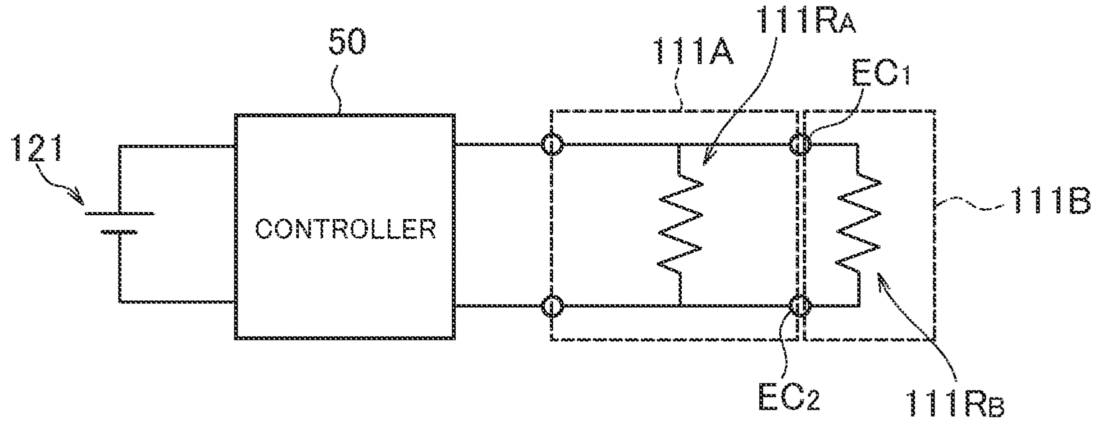
FIG. 5 is a diagram illustrating a circuit configuration of a generator 111R provided in each of a plurality of atomizing units 111 according to the embodiment.

A circuit configuration of the generator 111R provided in each of the plurality of atomizing units 111 according to the embodiment will be described. FIG. 5 is a diagram illustrating the circuit configuration of the generator 111R provided in each of the plurality of atomizing units 111 according to the embodiment.

As illustrated in FIG. 5, a generator 111$R_A$ provided in the first atomizing unit 111A and a generator 111$R_B$ provided in the second atomizing unit 111B are electrically connected in parallel. In a case illustrated in FIG. 5, when connecting the first atomizing unit 111A and the second atomizing unit 111B with each other, the generator 111$R_A$ and the generator 111$R_B$ are electrically connected via connection points ($EC_1$ and $EC_2$). The generator 111$R_A$ and the generator 111$R_B$ are electrically connected on an electrical circuit via the connection points ($EC_1$ and $EC_2$), without passing through the control circuit 50. Here, an electrode pair provided in the first atomizing unit 111A is electrically connected to the control circuit 50.

(Operation and Effect)

In the embodiment, the controller 51 calculates $D_1$ based on $V_A$ and $V_C$ and to control the power amount based on $D_1$. Therefore, even if the output voltage value of the battery may vary with the number of connections of the generator 111R and the configuration of each generator 111R (especially, the electrical resistance value), the desired amount of power can be supplied to the generator 111$R_A$ and the generator 111$R_B$.

First Modification

A first modification of the embodiment will be described, below. A difference from the embodiment will be mainly described, below.

Firstly, in the embodiment, a resistance heating element configuring the generator 111R has the shape of the coil extending so as to cross the air passage communicating from the inlet 120A to the outlet 200A. In contrary thereto, in the first modification, the resistance heating element configuring the generator 111R has a shape of a coil extending along the air passage communicating from the inlet 120A to the outlet 200A.

Secondly, in the embodiment, the first atomizing unit 111A and the second atomizing unit 111B are arranged in a serial positional relationship in the cylinder 100X. In contrary thereto, in the first modification, the first atomizing unit 111A and the second atomizing unit 111B are arranged in a parallel position relationship in the cylinder 100X.

Figure 6:
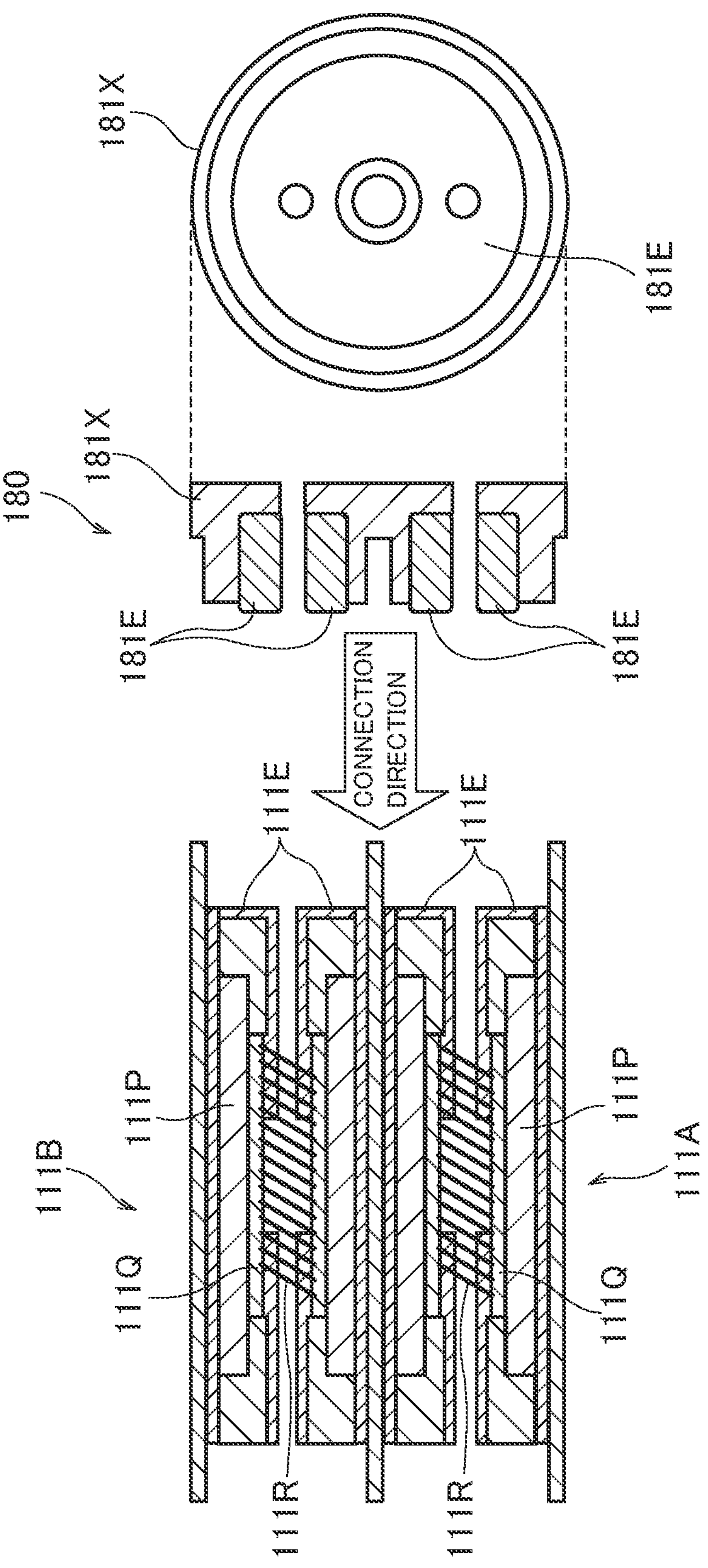
FIG. 6 is a diagram illustrating the atomizing unit 111 according to a first modification.

Specifically, as illustrated in FIG. 6, the first atomizing unit 111A and the second atomizing unit 111B are arranged in the parallel position relationship in the cylinder 100X. The flavor inhaler 10 includes, in addition to the plurality of atomizing units 111, a cap member 180. Each of the plurality of atomizing units 111 includes, in addition to the reservoir 111P, the wick 111Q, and the generator 111R, a conductive member 111E.

The conductive member 111E has a cylindrical shape configuring the air passage and includes one pair of electrode parts configuring one pair of electrodes (the positive electrode and the negative electrode). The one pair of electrode parts is arranged at an interval. The reservoir 111P mentioned above is arranged parallel to the air passage and is separated from the air passage by the conductive member 111E and the wick 111Q. The wick 111Q mentioned above has a cylindrical shape and is arranged parallel to the air passage. The wick 111Q is exposed to the air passage in the gap between the one pair of electrode parts. The generator 111R mentioned above is configured by a coiled resistance heating element extending along the air passage configured by the conductive member 111E. One end of the generator 111R is electrically connected to one part of the one pair of electrode parts and the other end of the generator 111R is electrically connected to the other part of the one pair of electrode parts.

The cap member 180 is configured by a conductive member 181E and an insulating member 181X. The conductive member 181E is electrically connected to the conductive member 111E of the atomizing unit 111. The insulating member 181X covers the conductive member 181E so that the conductive member 181E is not exposed at a downstream end surface or a side surface of the cap member 180.

Figure 7:
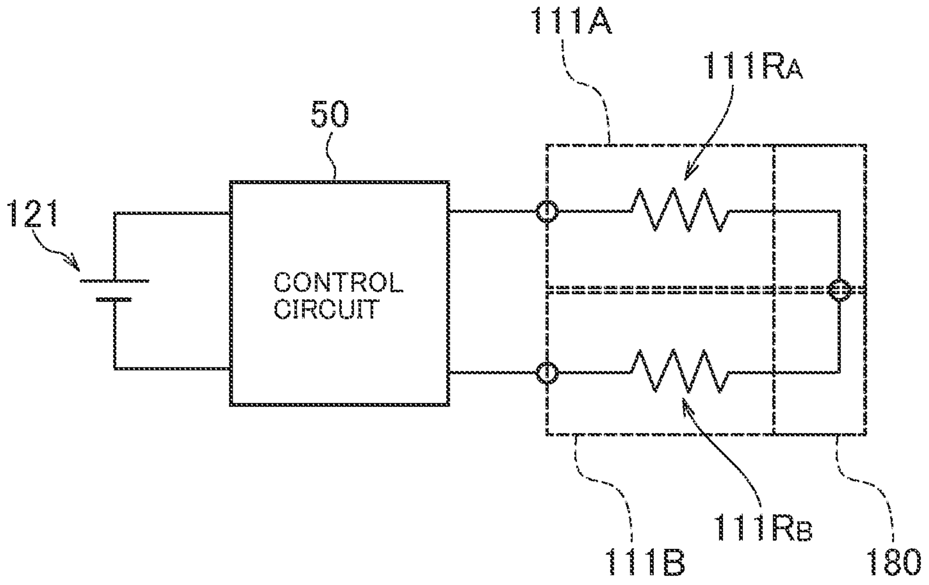
FIG. 7 is a diagram illustrating a circuit configuration of the generator 111R provided in each of the plurality of atomizing units 111 according to the first modification.

As illustrated in FIG. 7, the generator 111$R_A$ provided in the first atomizing unit 111A and the generator 111$R_B$ provided in the second atomizing unit 111B are electrically connected in series. In a case illustrated in FIG. 7, when connecting the first atomizing unit 111A and the second atomizing unit 111B by the cap member 180, the generator 111$R_A$ and the generator 111$R_B$ are electrically connected via the cap member 180. The generator 111$R_A$ and the generator 111$R_B$ are electrically connected on an electrical circuit via the cap member 180 (the conductive member 181E), without passing through the control circuit 50. Here, one of the electrodes provided in the first atomizing unit 111A (the electrode on the opposite side from the cap member 180 side) and one of the electrodes provided in the second atomizing unit 111B (the electrode on the opposite side from the cap member 180 side) are electrically connected to the control circuit 50.

(Operation and Effect)

In the first modification, the controller 51 calculates $D_1$ based on $V_A$ and $V_C$ and to control the power amount based on $D_1$. Therefore, even if the output voltage value of the battery may vary with the configuration of each generator 111R (especially, the electrical resistance value), the desired amount of power can be supplied to the generator 111$R_A$ and the generator 111$R_B$.

Second Modification

A second modification of the embodiment will be described, below. A difference from the embodiment will be mainly described, below.

In the second modification, a variation of the circuit configuration of the generator 111R provided in each of the plurality of atomizing units 111 will be described.

Figure 8:
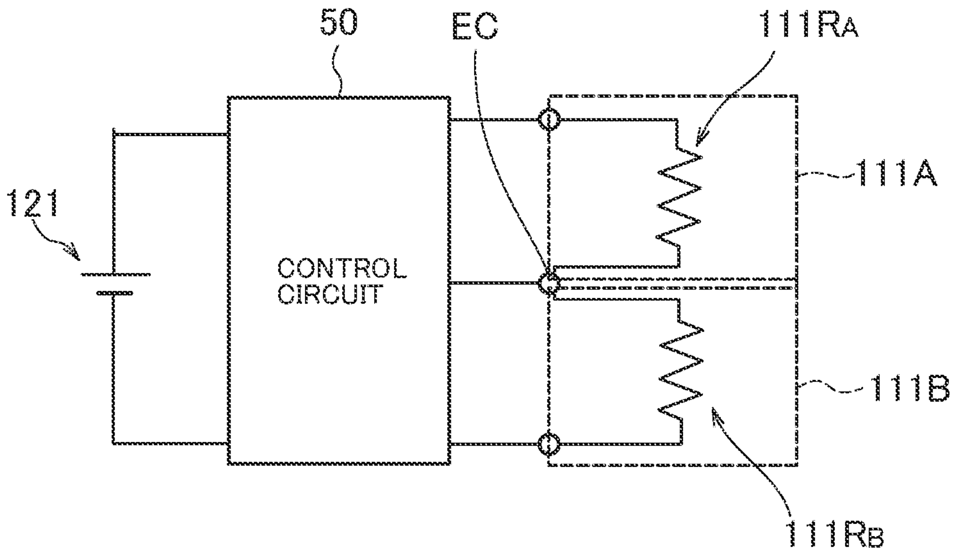
FIG. 8 is a diagram illustrating a circuit configuration of the generator 111R provided in each of the plurality of atomizing units 111 according to a second modification.

Firstly, as illustrated in FIG. 8, the generator 111$R_A$ provided in the first atomizing unit 111A and the generator 111$R_B$ provided in the second atomizing unit 111B may be electrically connected in parallel. In such a case, it is preferable that the resistance heating element configuring the generator 111R has the shape of the coil extending so as to cross the air passage communicating from the inlet 120A to the outlet 200A. It is preferable that the first atomizing unit 111A and the second atomizing unit 111B are arranged in a parallel position relationship in the cylinder 100X.

In such a case, when connecting the first atomizing unit 111A and the second atomizing unit 111B with each other, the generator 111$R_A$ and the generator 111$R_B$ are electrically connected via a connection point (EC). The generator 111$R_A$ and the generator 111$R_B$ are electrically connected on an electrical circuit via the connection point (EC), without passing through the control circuit 50. Here, each of the electrode pair provided in the first atomizing unit 111A and the electrode pair provided in the second atomizing unit 111B is electrically connected to the control circuit 50. Like-poled (+ pole or − pole) electrodes provided in the first atomizing unit 111A and the second atomizing unit 111B share the EC.

Figure 9:
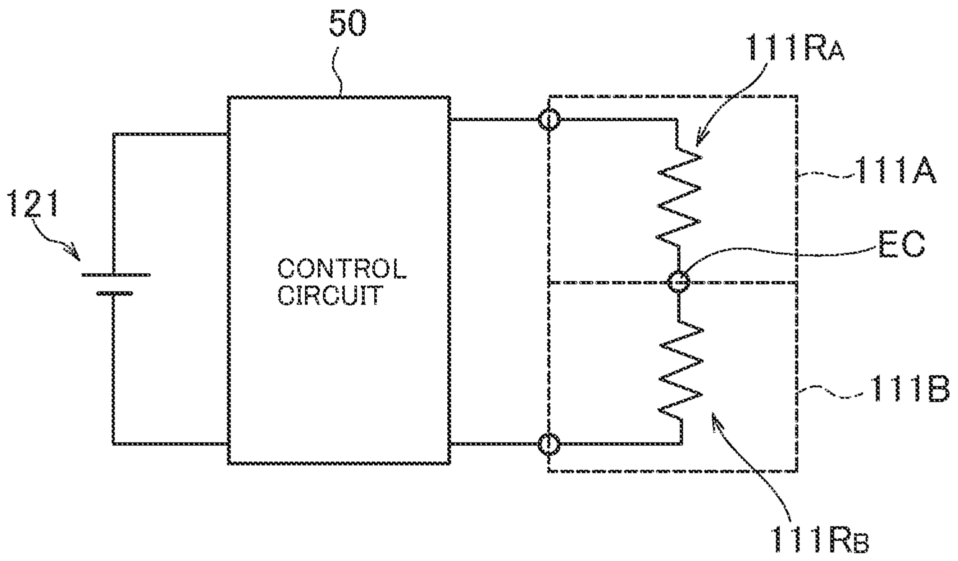
FIG. 9 is a diagram illustrating a circuit configuration of the generator 111R provided in each of the plurality of atomizing units 111 according to the second modification.

Secondly, as illustrated in FIG. 9, the generator 111$R_A$ provided in the first atomizing unit 111A and the generator 111$R_B$ provided in the second atomizing unit 111B may be electrically connected in series. In such a case, it is preferable that the resistance heating element configuring the generator 111R has the shape of the coil extending so as to cross the air passage communicating from the inlet 120A to the outlet 200A. It is preferable that the first atomizing unit 111A and the second atomizing unit 111B are arranged in a parallel position relationship in the cylinder 100X.

In such a case, when connecting the first atomizing unit 111A and the second atomizing unit 111B with each other, the generator 111$R_A$ and the generator 111$R_B$ are electrically connected via the connection point (EC). The generator 111$R_A$ and the generator 111$R_B$ are electrically connected on the electrical circuit via the connection point (EC), without passing through the control circuit 50. Here, one of the electrodes provided in the first atomizing unit 111A (the electrode on the opposite side from the EC) and one of the electrodes provided in the second atomizing unit 111B (the electrode on the opposite side from the EC) are electrically connected to the control circuit 50.

Figure 10:
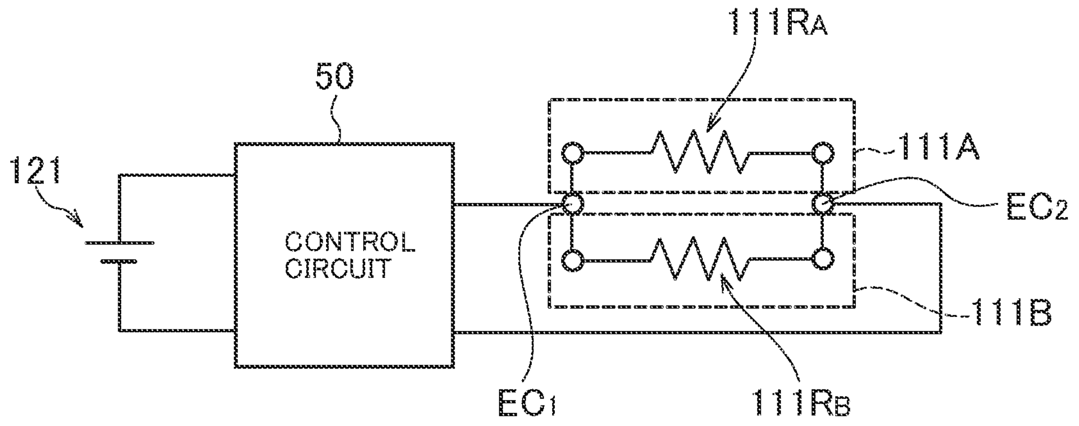
FIG. 10 is a diagram illustrating a circuit configuration of the generator 111R provided in each of the plurality of atomizing units 111 according to the second modification.

Thirdly, as illustrated in FIG. 10, the generator 111$R_A$ provided in the first atomizing unit 111A and the generator 111$R_B$ provided in the second atomizing unit 111B may be electrically connected in parallel. In such a case, it is preferable that the resistance heating element configuring the generator 111R has the shape of the coil extending along the air passage communicating from the inlet 120A to the outlet 200A. It is preferable that the first atomizing unit 111A and the second atomizing unit 111B are arranged in a parallel position relationship in the cylinder 100X.

In such a case, when connecting the first atomizing unit 111A and the second atomizing unit 111B with each other, the generator 111$R_A$ and the generator 111$R_B$ are electrically connected via the connection points ($EC_1$ and $EC_2$). The generator 111$R_A$ and the generator 111$R_B$ are electrically connected on the electrical circuit via the connection points ($EC_1$ and $EC_2$), without passing through the control circuit 50. Here, the connection points ($EC_1$ and $EC_2$) are electrically connected to the control circuit 50.

Figure 11:
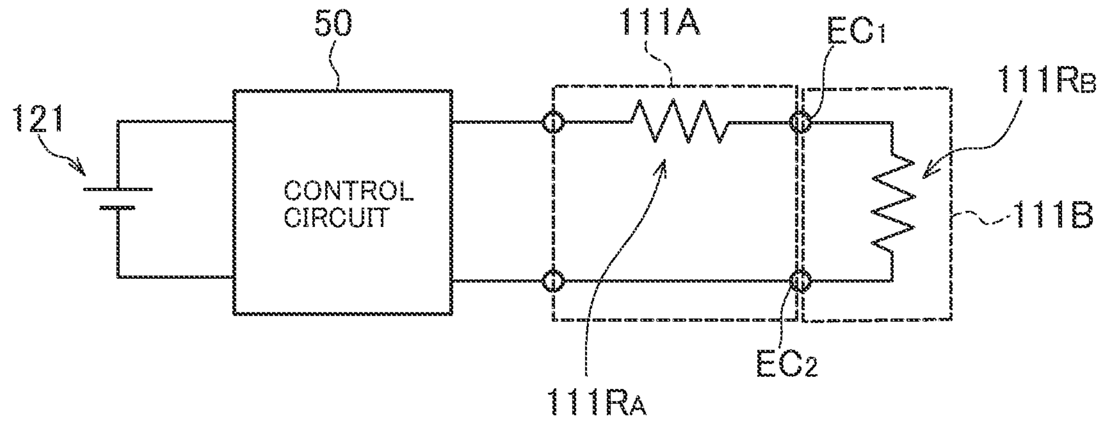
FIG. 11 is a diagram illustrating a circuit configuration of the generator 111R provided in each of the plurality of atomizing units 111 according to the second modification.

Fourthly, as illustrated in FIG. 11, the generator 111$R_A$ provided in the first atomizing unit 111A and the generator 111$R_B$ provided in the second atomizing unit 111B may be electrically connected in series. In such a case, it is preferable that the resistance heating element configuring the generator 111$R_A$ has the shape of the coil extending along the air passage communicating from the inlet 120A to the outlet 200A. On the other hand, it is preferable that the resistance heating element configuring the generator 111$R_B$ has the shape of the coil extending so as to cross the air passage communicating from the inlet 120A to the outlet 200A. It is preferable that the first atomizing unit 111A and the second atomizing unit 111B are arranged in a serial positional relationship in the cylinder 100X.

In such a case, when connecting the first atomizing unit 111A and the second atomizing unit 111B with each other, the generator 111$R_A$ and the generator 111$R_B$ are electrically connected via the connection points ($EC_1$ and $EC_2$). The generator 111$R_A$ and the generator 111$R_B$ are electrically connected on the electrical circuit via the connection points ($EC_1$ and $EC_2$), without passing through the control circuit 50. Here, the electrode pair provided in the first atomizing unit 111A is electrically connected to the control circuit 50.

Third Modification

A third modification of the embodiment will be described, below. A difference from the embodiment will be mainly described, below.

In the third modification, a variation of the positional relationship of the plurality of atomizing units 111 and of the configuration of the resistance heating element configuring the generator 111R will be described.

Figure 12:
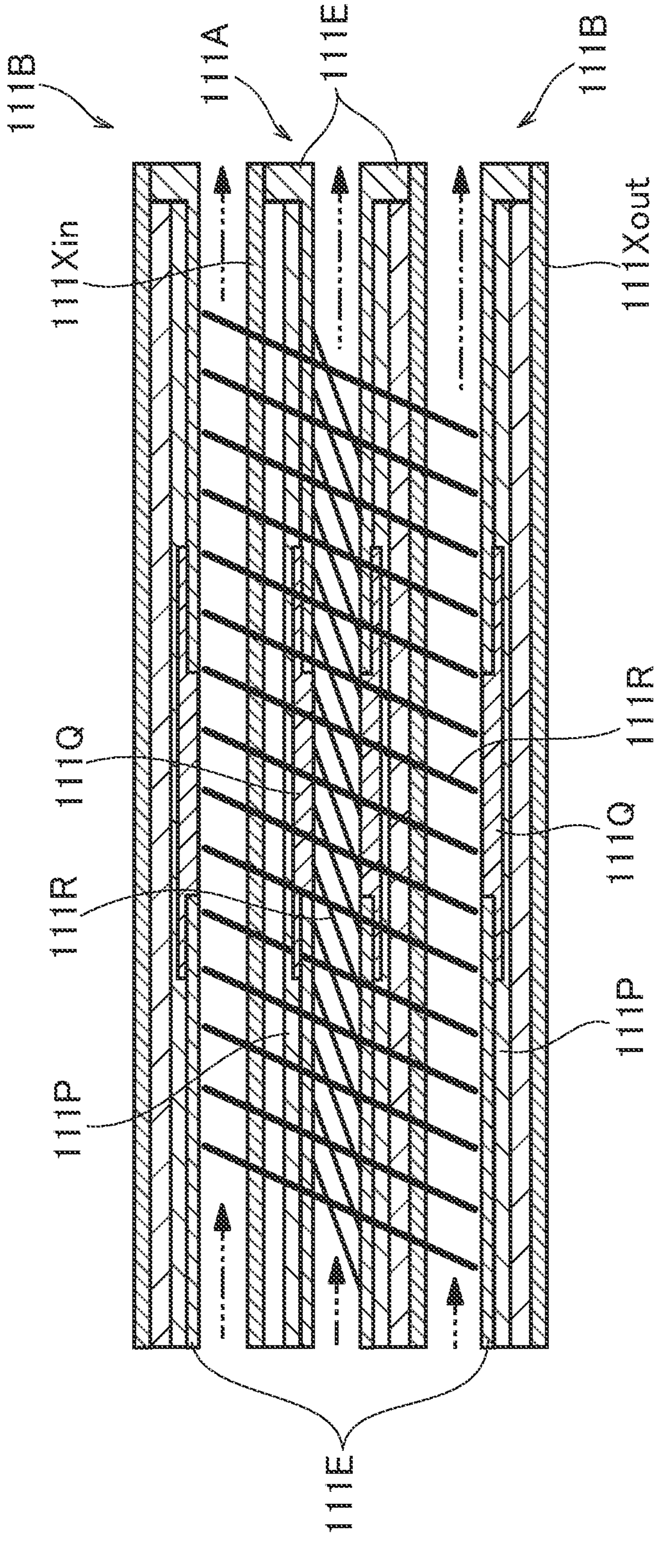
FIG. 12 is a diagram illustrating the atomizing unit 111 according to a third modification.

For example, as illustrated in FIG. 12, the first main body unit 110 includes a cylinder 111Xin that houses the first atomizing unit 111A and a cylinder 111Xout that houses the second atomizing unit 111B. The cylinder 111Xin and the cylinder 111Xout are of a coaxial cylindrical shape and the cylinder 111Xout is arranged outside the cylinder 111Xin. Specifically, the first atomizing unit 111A is arranged inside the cylinder 111Xin and the second atomizing unit 111B is arranged between the cylinder 111Xin and the cylinder 111Xout.

Here, the first atomizing unit 111A and the second atomizing unit 111B are arranged in a coaxial and inside-outside relationship in the cylinder 111Xout and such a position relationship may be considered a parallel position relationship. The generator 111R provided in the first atomizing unit 111A and the second atomizing unit 111B is configured by a resistance heating element having the shape of the coil extending along the air passage communicating from the inlet 120A to the outlet 200A. It is noted that the basic configuration of the first atomizing unit 111A and the second atomizing unit 111B is similar to that in the first modification (FIG. 7) and thus, detailed description thereof will be omitted.

According to such a configuration, the aerosol generated from the first atomizing unit 111A passes through an air passage configured by the space inside the cylinder 111Xin. On the other hand, the aerosol generated from the second atomizing unit 111B passes through an air passage configured by the space between the cylinder 111Xin and the cylinder 111Xout.

Fourth Modification

A fourth modification of the embodiment will be described, below. A difference from the embodiment will be mainly described, below.

In the fourth modification, a variation of the control of the power to be supplied to the generator 111R will be described.

Specifically, as mentioned above, the controller 51 controls the power to be supplied to the plurality of generators 111R, according to the power amount corrected based on $D_1$ (that is, $D_1 \times E_A$). In such a case, in a state where the voltage is applied to the generator 111$R_A$ and the generator 111$R_B$, it is preferable that the controller 51 acquires $V_A$ and sets the correction term $D_1$.

In a case where the generator 111$R_A$ and the generator 111$R_B$ are electrically connected in series, the controller 51 may calculate a correction term $D_2$ based on $R_1$ and $R_2$ and control the power amount to be supplied to the generator 111$R_A$ based on $D_2$. For example, the controller 51 calculates the correction term $D_2$ according to an equation of $D_2=(R_1+R_2)^2/R_1^2$. Specifically, as mentioned above, the controller 51 controls the power to be supplied to the generator 111R according to the power amount corrected based on $D_2$ (that is, $D_2 \times E_A$) or the power amount corrected based on $D_1$ and $D_2$ (that is, $D_1 \times D_2 \times E_A$).

$R_1$: the electrical resistance value of the generator 111$R_A$ $R_2$: the electrical resistance value of the generator 111$R_B$ According to such a configuration, even if the output voltage value $V_A$ of the battery may vary with the number of connections of the generator 111R and the configuration of each generator 111R (the electrical resistance value), the power amount to be supplied to the generator 111$R_A$ can be stabilized. It is noted that the correction term $D_2$ should be calculated according to an equation of $D_2=(R_1+R_2)^2/R_2^2$ so that the power amount to be supplied to the generator 111$R_B$ is stabilized.

Here, in a case where the electrical resistance value of the generator 111$R_A$ of the first atomizing unit 111A can be detected (for example, in the case illustrated in FIG. 5 of the embodiment) in a state where the second atomizing unit 111B is not connected, the controller 51 may acquire the electrical resistance value of the generator 111$R_A$ and a combined resistance value of the generator 111$R_A$ and the generator 111$R_B$. For example, the controller 51 detects the electrical resistance value of the generator 111$R_A$ in a state where the first atomizing unit 111A is electrically connected, and detects the combined electrical resistance value in a state where the first atomizing unit 111A and the second atomizing unit 111B are electrically connected. Further, with such a configuration, it is possible to acquire the electrical resistance value of the generator 111$R_A$ and the generator 111$R_B$, even if the first atomizing unit 111A and the second atomizing unit 111B do not include the memory 111M.

On the other hand, in a case where the electrical resistance value of the generator 111$R_A$ of the first atomizing unit 111A cannot be detected (for example, in the case illustrated in FIG. 7 of the first modification) in a state where the second atomizing unit 111B is not connected, the controller 51 reads out the electrical resistance value of the generator 111$R_A$ from the memory 111M provided in the first atomizing unit 111A and detects the combined resistance value in the state in which the first atomizing unit 111A and the second atomizing unit 111B are electrically connected. With such a configuration, it is possible to acquire the electrical resistance value of the generator 111$R_A$ and the generator 111$R_B$, even if the second atomizing unit 111B does not include the memory 111M.

Further, the first atomizing unit 111A and the second atomizing unit 111B may both include the memory 111M, regardless of whether or not the electrical resistance value of the generator 111$R_A$ of the first atomizing unit 111A can be detected in the state in which the second atomizing unit 111B is not connected.

Fifth Modification

A fifth modification of the embodiment will be described, below. A difference from the embodiment will be mainly described, below.

Specifically, in the embodiment, the information stored in the memory 111M includes: specific parameters (a, b, $T_{MIN}$, $T_{MAX}$) of the atomizing unit 111; the electrical resistance value (R) of the generator 111R; and the remaining amount information indicating the remaining amount ($M_i$) of the inhalation component source. In contrary thereto, in the first modification, the information stored in the memory 111M is identification information associated with the above-described information.

In such a case, the controller 51 may access an external device connected to the flavor inhaler 10 to acquire, from the external device, information corresponding to the identification information. The external device includes, for example, a personal computer, a smart phone, and a tablet. A scheme for accessing the external device may be a USB scheme or may be a radio scheme such as Bluetooth (tradename) and NFC (Near Field Communication).

Alternatively, the information source including the identification information associated with various types of parameters may be, for example, a medium provided separately from the atomizing unit 111, instead of the memory 111M provided in the atomizing unit 111. The medium is, for example, a paper medium indicating the identification information (such as a label attached to an external surface of the atomizing unit 111, an instruction packaged together with the atomizing unit 111, and a container such as a box to house the atomizing unit 111).

In such a case, the controller 51 has a function (for example, a barcode reader function) for reading out the identification information indicated on the medium and reads out the identification information from the medium.

Sixth Modification

A sixth modification of the embodiment will be described below. A difference from the embodiment will be mainly described, below.

Figure 13:
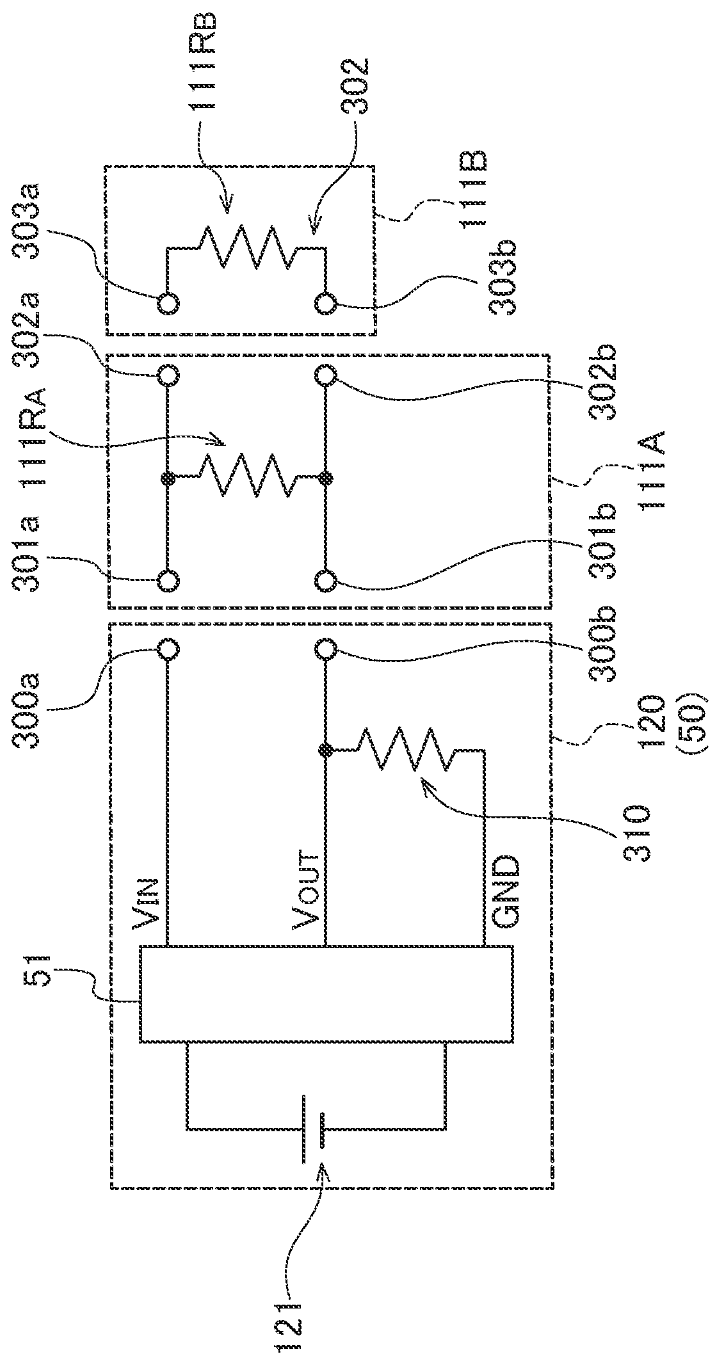
FIG. 13 is a diagram illustrating a circuit configuration of the generator 111R provided in each of the plurality of atomizing units 111 according to a sixth modification.

In the sixth modification, as illustrated in FIG. 13, if the second atomizing unit 111B is connected to the first atomizing unit 111A, the flavor inhaler 10 includes the generator 111$R_B$ that electrically conducts in parallel with the generator 111$R_A$. Specifically, the flavor inhaler 10 includes an electrical path 302 that electrically connects the generator 111$R_A$ and the generator 111$R_B$ in parallel and a part of the electrical path 302 is provided in the second atomizing unit 111B. The generator 111$R_B$ is provided in the second atomizing unit 111B.

In the sixth modification, the electrical path 302 includes electrical terminals 300*a*, 300*b*, 301*a*, and 301*b* that electrically connects the second main body unit 120 (the control circuit 50) and the first atomizing unit 111A; and includes electrical terminals 302*a*, 302*b*, 303*a*, and 303*b* that electrically connects the first atomizing unit 111A and the second atomizing unit 111B. In order to connect the generator 111$R_B$ to the generator 111$R_A$ in parallel, a voltage substantially equivalent to the voltage value applied to the generator 111$R_A$ ($V_{IN}-V_{OUT}$) is applied to the generator 111$R_B$.

The flavor inhaler 10 may include a known resistor 310 electrically connected to the generator 111$R_A$ and the generator 111$R_B$ in series and including a known electrical resistance value. It is preferable that the known resistor 310 is provided in the second main body unit 120 (the control circuit 50). A voltage corresponding to a difference between the output voltage $V_{OUT}$ of the generator 111$R_A$ and a ground electrode is applied to the known resistor 310.

The controller 51 detects s a connection between the first atomizing unit 111A and the second atomizing unit 111B based on a difference between a combined resistance value $R_C$ of the generator 111$R_A$ and the generator 111$R_B$ and the electrical resistance value $R_1$ of the generator 111$R_A$. If the second atomizing unit 111B is not connected to the first atomizing unit 111A, the electrical resistance value of an electrical circuit connected to the electrical terminal 300*a* and the electrical terminal 300*b* of the control circuit 50 substantially coincides with the electrical resistance value $R_1$ of the generator 111$R_A$. If the second atomizing unit 111B is connected to the first atomizing unit 111A, the electrical resistance value of the electrical circuit connected to the electrical terminal 300*a* and the electrical terminal 300*b* of the control circuit 50 substantially corresponds to the combined resistance value $R_C (<R_1)$ of the electrical resistance value $R_1$ of the generator 111$R_A$ and an electrical resistance value $R_2$ of the generator 111$R_B$. Accordingly, the controller 51 can detect whether the second atomizing unit 111B is connected to the first atomizing unit 111A, based on the difference between the electrical resistance value $R_1$ of the generator 111$R_A$ and the combined resistance value $R_C$.

As a specific example, the controller 51 can detect whether the second atomizing unit 111B is connected to the first atomizing unit 111A according to the following procedure. First, if the second atomizing unit 111B is not connected to the first atomizing unit 111A, the controller 51 measures the electrical resistance value $R_1$ of the generator 111$R_A$. The electrical resistance value $R_1$ is stored in a memory of the controller 51. At a predetermined timing, the controller 51 measures the electrical resistance value of the electrical circuit connected to the electrical terminal 300*a* and the electrical terminal 300*b*. If the second atomizing unit 111B is connected to the first atomizing unit 111A, the electrical resistance value corresponds to the combined resistance value $R_C$ ($<R_1$) mentioned above. If detecting an electrical resistance value smaller than the electrical resistance value $R_1$, the controller 51 determines that the second atomizing unit 111B is connected to the first atomizing unit 111A. It is noted that if detecting an electrical resistance value sufficiently smaller than the electrical resistance value $R_1$, considering a measurement precision of the electrical resistance value, the controller 51 may determine that the second atomizing unit 111B is connected to the first atomizing unit 111A.

It is preferable that a timing at which the controller 51 measures the electrical resistance value of the electrical circuit connected to the electrical terminal 300*a* and the electrical terminal 300*b*, is a timing when the user performs an inhalation action. For example, the controller 51 measures the electrical resistance value, if a sensor provided in the air passage detects the inhalation action.

Alternatively, the controller 51 may measure the electrical resistance value of the electrical circuit connected to the electrical terminal 300*a* and the electrical terminal 300*b*, if the user pushes the switch for driving the generator 111$R_A$, for example, the push button. Further, the controller 51 may measure the electrical resistance value of the electrical circuit connected to the electrical terminal 300*a* and the electrical terminal 300*b*, at each predetermined time interval.

Further, the controller 51 may measure the electrical resistance value of the electrical circuit connected to the electrical terminal 300*a* and the electrical terminal 300*b*, if a sleep mode (power-saving mode) in which electric conduction of the generator 111$R_A$ (or/and the generator 111$R_B$) is not allowed, is switched into a ready mode in which the generator 111$R_A$ (or/and the generator 111$R_B$) can be controlled. Switching from the sleep mode to the ready mode can be performed, for example, if the pushbutton is pushed for a predetermined time or longer during the sleep mode, or if a specific pattern of an inhaling action is performed by the user (for example, such as performing an inhaling action for a short duration of about two seconds for three times within a predetermined time) during the sleep mode.

Further, if the flavor inhaler 10 has a user authentication function, the controller 51 may measure the electrical resistance value of the electrical circuit connected to the electrical terminal 300*a* and the electrical terminal 300*b* at a timing when an action for user authentication is performed. The user authentication may be performed by detecting a characteristic of the inhalation action by the user by the sensor provided in the air passage, for example. However, a user authentication method is not limited to this example.

It is noted that the electrical resistance value of the electrical circuit connected to the electrical terminal 300*a* and the electrical terminal 300*b* can be measured as follows. First, an input voltage $V_{IN}$ to the generator 111$R_A$ and the output voltage $V_{OUT}$ of the generator 111$R_A$ (being an input voltage of the known resistor 310) are measured. An electrical resistance value R of the electrical circuit connected to the electrical terminal 300*a* and the electrical terminal 300*b* is calculated by the following equation using the voltage values $V_{IN}$ and $V_{OUT}$ and an electrical resistance value $R_3$ of the known resistor 310:

$$R=((V_{IN}-V_{OUT})/V_{OUT})\times R_3.$$

If the second atomizing unit 111B is not connected to the first atomizing unit 111A, the electrical resistance value $R_1$ of the generator 111$R_A$ is substantially calculated from the equation above. Further, if the second atomizing unit 111B is connected to the first atomizing unit 111A, the combined resistance value $R_C$ is substantially calculated from the equation above.

As discussed above, it is preferable that the controller 51 estimates the combined resistance value $R_C$ by using the electrical resistance value $R_3$ of the known resistor 310. An example of an arrangement of the known resistor 310 is illustrated in FIG. 13. As long as the electrical resistance value $R_1$ of the generator 111$R_A$ and the combined resistance value $R_C$ of the generator 111$R_A$ and the generator 111$R_B$ can be measured, the known resistor 310 may be arranged at any position on the electrical circuit. It is noted that the electrical resistance value R of the known resistor 310 may be in a range from 10 mΩ to 100 mΩ.

After sensing the connection between the first atomizing unit 111A and the second atomizing unit 111B, the controller 51 may perform control of the power amount supplied to the generator 111$R_A$ (or/and the generator 111$R_B$), or notification control of notification means provided in the flavor inhaler 10. The notification means include, for example, a light-emitting element, a voice and sound output device, a sense feedback device such as a Haptics device, and the like. If the sense feedback device is used as the notification means, a vibrating element or the like may be provided and notification may be performed by propagating a vibration to the user, for example.

The controller 51 may prohibit power supply to the generator 111$R_A$ if the difference between the combined resistance value $R_C$ and the electrical resistance value $R_1$ of the generator 111$R_A$ is equal to or lower than a predetermined first threshold value. As a result, it is possible to configure the flavor inhaler 10 to be not usable if the second atomizing unit 111B is not connected to the first atomizing unit 111A. Further, it is possible to prohibit the use of an irregular device with a configuration in which power is not supplied to the generator 111$R_A$, if an irregular component not having the generator 111$R_B$, different from the regular second atomizing unit 111B, connects to the first atomizing unit 111A.

Further, the controller 51 may prohibit power supply to the generator 111$R_A$ if the difference between the combined resistance value $R_C$ and the electrical resistance value $R_1$ of the generator 111$R_A$ is equal to or higher than a predetermined second threshold value (a value higher than the above-described first threshold value). As a result, it is possible to stop the power supply to the generator 111$R_A$, if a short circuit occurs between the electrical terminal 302*a* and the electrical terminal 302*b*.

Further, the controller 51 may stop the power supply to the generator 111$R_A$ if the difference between the combined resistance value $R_C$ and the electrical resistance value $R_1$ of the generator 111$R_A$ is equal to or lower than the predetermined first threshold value mentioned above and if the difference is equal to or higher than the predetermined second threshold value mentioned above. As a result, it is possible to prohibit the power supply to the generator 111$R_A$, if an irregular device including a resistor having a completely different electrical resistance value than the electrical resistance value of the generator 111$R_B$ of a regular device, is connected to the first atomizing unit 111A.

In the case mentioned above, if the second atomizing unit 111B is not connected to the first atomizing unit 111A, the controller 51 measures the electrical resistance value $R_1$ of the generator 111$R_A$ and stores the measured electrical resistance value $R_1$ in the memory of the controller 51. However, the sixth modification is not limited thereto. If the electrical resistance value $R_1$ of the generator 111$R_A$ is stored in the memory 111M of the first atomizing unit 111A, the controller 51 may read out the electrical resistance value $R_1$ of the generator 111$R_A$ from the memory 111M of the first atomizing unit 111A, without measuring the electrical resistance value $R_1$ of the generator 111$R_A$.

Further, the electrical resistance value $R_1$ of the generator 111$R_A$ may be stored in the memory 111M of the first atomizing unit 111A, and the electrical resistance value $R_2$ of the generator 111$R_B$ may be stored in the memory 111M of the second atomizing unit 111B. In such a case, the controller 51 may calculate the combined resistance value $R_C$ of the generator 111$R_A$ and the generator 111$R_B$, based on the electrical resistance values $R_1$ and $R_2$ read out from the memory 111M. The controller 51 may determine whether or not the second atomizing unit 111B is connected to the first atomizing unit 111A, based on a result of a comparison between the electrical resistance value $R_1$ read out from the memory 111M of the first atomizing unit 111A and a calculated value of the combined resistance value $R_C$, instead of a result of a comparison between a measurement value of the electrical resistance value of the electrical circuit connected to the electrical terminal 300*a* and the electrical terminal 300*b* (that is, the measurement value of the combined resistance value $R_C$ mentioned above) and the electrical resistance value $R_1$ of the generator 111$R_A$. For example, the controller 51 determines that the second atomizing unit 111B is connected to the first atomizing unit 111A, if the difference between the electrical resistance value $R_1$ read out from the memory 111M of the first atomizing unit 111A and the calculated value of the combined resistance value $R_C$ is equal to or higher than the predetermined value. In such a case, the known resistor 310 may not be provided.

Other Embodiments

The present invention has been described according to the embodiment set forth above; however, the invention should not be understood to be limited by the statements and the drawings constituting a part of this disclosure. From this disclosure, various alternative embodiments, examples, and operational technologies will become apparent to those skilled in the art.

In the embodiment, the generator 111R (the generator 111$R_A$) provided in the first atomizing unit 111A is given as an example of the first generator that generates the first inhalation component from the first inhalation component source by the power supplied from the battery. Similarly, the generator 111R (the generator 111$R_B$) provided in the second atomizing unit 111B is given as an example of the second generator that generates the second inhalation component from the second inhalation component source by the power supplied from the battery. However, the embodiment is not limited thereto. Specifically, the first generator and the second generator may not be configured by the resistance heating element. For example, the first generator and the second generator may be members that generate an aerosol by ultrasonic wave atomization without producing heat. Alternatively, the first generator and the second generator may be members that generate the inhalation component by heating the inhalation component source without atomization. A scheme for generating the inhalation component (atomization scheme and heating scheme) may be different between the first generator and the second generator. For example, the electrical resistance value of the resistance heating element configuring the first generator may be different from that for the second generator. An amount of inhalation component generated from the first generator may be different from that from the second generator. The aerosol may not be generated from any one of the first generator and the second generator.

In the embodiment, the first inhalation component source and the second inhalation component source are aerosol sources. However, the embodiment is not limited thereto. Specifically, the first inhalation component source and the second inhalation component source may be members not including an aerosol source, but including a flavor component such as menthol. A composition and type of the first inhalation component source may be different from that of the second inhalation component source. The first inhalation component source and the second inhalation component source may be liquid and may be solid. One of the first inhalation component source and the second inhalation component source may be liquid and the other of the first inhalation component source and the second inhalation component source may be solid.

In the embodiment, the first inhalation component source is incorporated in a unit including the first generator and the second inhalation component source is incorporated in a unit including the second generator. However, the embodiment is not limited thereto. The first inhalation component source may be stored in a storing unit separate from the unit including the first generator and the second inhalation component source may be stored in a storing unit separate from the unit including the second generator.

In the embodiment, the first atomizing unit 111A and the second atomizing unit 111B may be configured to be attachable to and detachable from the cylinder 100X. The first atomizing unit 111A and the second atomizing unit 111B may be configured to be attachable to and detachable from each other. However, the embodiment is not limited thereto. The first atomizing unit 111A and the second atomizing unit 111B may be attached fixedly on the cylinder 100X. The first atomizing unit 111A and the second atomizing unit 111B may be an integrated unit.

The invention claimed is:

1. A flavor inhaler comprising:

a battery that accumulates a power;

a first generator that generates a first inhalation component from a first inhalation component source by the power supplied from the battery;

a second generator that generates a second inhalation component from a second inhalation component source by the power supplied from the battery; and a controller that controls a power amount to be supplied to the first generator and the second generator, wherein the first generator and the second generator are provided on an air passage communicating from an inlet to an outlet, wherein the first generator and the second generator are electrically connected in parallel or in series, wherein the controller calculates a correction term of the power amount to be supplied to the first generator and the second generator ($D_1$) based on an output voltage value of the battery ($V_a$) and a predetermined reference voltage value ($V_C$), wherein the output voltage value is measured when the power is supplied to the first generator and the second generator during a time from detecting the start of the puff action until at least one of the first generator and the second generator is substantially driven, and wherein the controller controls the power amount based on the correction term of the power amount.

2. The flavor inhaler according to claim 1, wherein the second generator is provided downstream of the first generator on the air passage.

3. The flavor inhaler according to claim 1, wherein the first generator and the second generator are electrically connected in series.

4. A flavor inhaler according to claim 1, wherein at least one of the first generator and the second generator is a coiled resistance heating element extending along the air passage.

5. The flavor inhaler according to claim 1, comprising:

a first unit including at least the first generator; and a second unit including at least the second generator, wherein the first unit and the second unit are separate bodies.

6. The flavor inhaler according to claim 5, wherein the second unit is configured to be attachable to and detachable from the first unit.

7. The flavor inhaler according to claim 5, wherein the first generator and the second generator are electrically connected via a connection point or a conductive member when connecting the first unit and the second unit, and wherein the first generator and the second generator are electrically connected on an electrical circuit via the connection point or the conductive member, without passing through the controller.

8. The flavor inhaler according to claim 1, wherein at least one of the first inhalation component source and the second inhalation component source is an aerosol source, and wherein at least one of the first generator and the second generator is an atomizer atomizing the aerosol source.

9. The flavor inhaler according to claim 8, wherein the atomizer is configured by a resistance heating element.

10. The flavor inhaler according to claim 1, wherein the controller calculates the correction term of the power amount to be supplied to the first generator and the second generator according to an equation of $D_1=V_C^2/V_A^2$.

11. The flavor inhaler according to claim 1, wherein the controller acquires the output voltage value of the battery when a voltage is applied to at least any one of the first generator and the second generator.

12. The flavor inhaler according to claim 1, wherein the first generator and the second generator are configured by a resistance heating element, and wherein the controller acquires an electrical resistance value of the first generator and a combined resistance value of the first generator and the second generator.

13. The flavor inhaler according to claim 1, wherein the first generator and the second generator are electrically connected in series, the first generator and the second generator are configured by a resistance heating element, an electrical resistance value of the first generator is expressed by $R_1$, an electrical resistance value of the second generator is expressed by $R_2$, wherein the controller calculates a correction term of the power amount to be supplied to the first generator ($D_2$) based on an electrical resistance value of the first generator ($R_1$) and an electrical resistance value of the second generator ($R_2$), and wherein the controller controls the power amount to be supplied to the first generator based on the correction term of the power amount to be supplied to the first generator.

14. The flavor inhaler according to claim 13, wherein the controller calculates the correction term of the power amount to be supplied to the first generator according to an equation of $D_2=(R_1+R_2)^2/R_1^2$.

15. The flavor inhaler according to claim 1, wherein the first generator is configured by a resistance heating element, and wherein an information source is provided, the information source including the electrical resistance value of the first generator or identification information associated with the electrical resistance value of the first generator.

16. The flavor inhaler according to claim 1, wherein the controller controls the power amount to be supplied to the first generator so that the power amount to be supplied to the first generator during one puff action does not exceed an upper limit threshold value.

* * * * *